United States Patent Office 2,841,495
Patented July 1, 1958

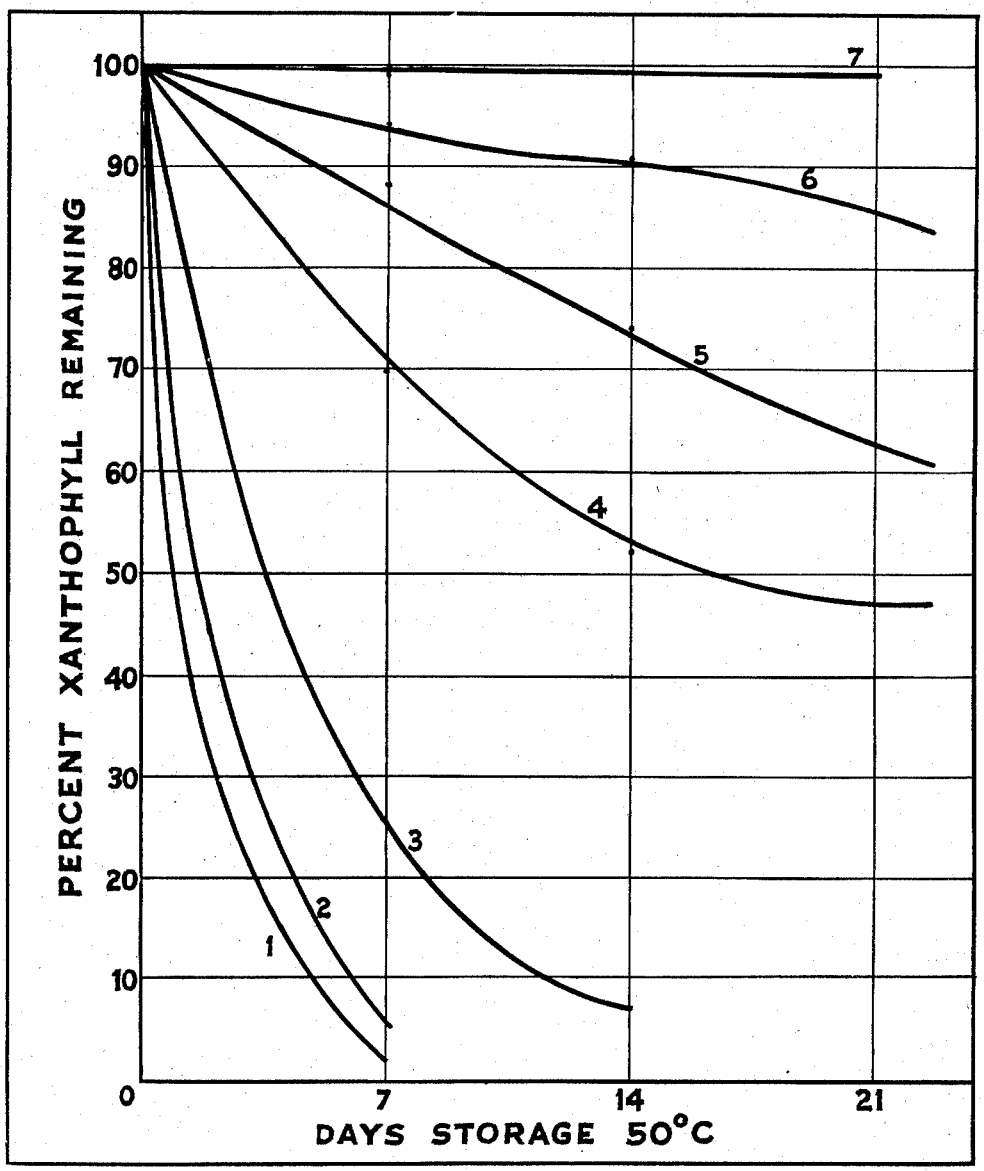

2,841,495

DRY STABLE FEED COMPOSITION

Charles W. Stewart, Hinsdale, Ill., assignor to Corn Products Refining Company, New York, N. Y., a corporation of New Jersey Application February 6, 1956, Serial No. 563,752

10 Claims. (Cl. 99—2)

This invention relates to a dry composition of matter containing carotenoid pigments, particularly xanthophyll, which is stable against oxidative deterioration.

Xanthophyll oil which is contained in small quantities in corn (maize) gluten is recovered therefrom as a by-product in the recovery of zein from the gluten. This oil, because of the xanthophyll therein, has been found to be useful in poultry feeding to provide pigmentation in the skin, body fat, legs, comb and beak of the poultry, and also in egg yolk. In view of the low xanthophyll content of some feed compositions, it has been proposed to increase their pigmenting power by adding thereto the aforementioned xanthophyll oil or alfalfa xanthophyll oil. However, this proposal has not been successful because of the rapid deterioration of xanthophyll, probably brought about by oxidation.

Xanthophyll in its natural state, for example in gluten, is stable against oxidative deterioration but recovered xanthophyll deteriorates rapidly, e. g., in 2 or 3 days' time, when exposed to air in a thin film such as would be involved in a coating on feed materials. Accordingly, there is a need for a composition of matter containing xanthophyll which has a stability at least equal to that contained in plant materials, such as yellow corn or corn gluten, or preferably, a higher stability.

It is an object of the present invention to provide a new composition of matter containing carotenoid pigments which has a stability against oxidative deterioration of these pigments equal to or superior to that of plant materials containing carotenoid pigments in their natural state. It is a further object to provide such a composition of uniform potency which is suitable for use in animal and poultry feeds. Still another object is to provide such a composition in dry form which can be handled and shipped readily and stored for long periods of time without loss of xanthophyll content. Other objects will appear hereinafter.

I have found that xanthophyll which has been recovered from plant sources can be stabilized against oxidative deterioration by absorbing the xanthophyll, dissolved in a suitable solvent, such as vegetable oil, on deoiled vegetable oil bearing materials, e. g., spent corn or grain sorghum germ meal, and suitably coating this product followed by drying if necessary. The coating may consist of any of the following: steep liquor; and various mixtures of steep liquor and carbohydrates, such as steep liquor-molasses (corn sugar molasses or cane sugar molasses) mixture, steep liquor-dextrose greens mixture, steep liquor-corn sirup mixture, the amount of steep liquor in the mixture being at least about 50%, dry basis. Optionally, there may be used in combination with the aforementioned coating materials for further stabilization a reducing agent or an antioxidant or a combination of the two.

Inasmuch as xanthophyll is usually recovered from plant sources, e. g., corn (maize), alfalfa, in the form of xanthophyll oil, it is desirable to use xanthophyll oil as the source of xanthophyll, but xanthophyll itself may be used also, particularly where it is desired to produce a product having a high potency of xanthophyll.

The deoiled vegetable oil material which is particularly useful as the carrier in the present invention is that left after corn or grain sorghum germ has been passed through machines to expel the oil or after solvent extraction of the germ to recover oil or after a combination of these two methods of recovering oil. Commercially deoiled soybeans (soybean flakes), deoiled cottonseed (cottonseed meal), deoiled flax (linseed meal) and similar materials may be used also.

In carrying out the process of the invention, the xanthophyll in the form of xanthophyll oil, for example, is mixed with the spent germ meal, for example, and warmed to 120–140° F. to reduce the viscosity of the oil and to drive out air from the capillaries of the germ with resultant increase of the rate of absorption of the oil by the germ meal. When an antioxidant is used, it is preferable to incorporate it in the oil before addition to the germ meal but it may be added during the mixing of the germ meal and oil. The germ meal and oil are mixed for a sufficient time to allow maximum absorption of the oil, 5 to 25 minutes usually being sufficient. If xanthophyll itself is used, it may be dissolved in methyl or ethyl alcohol and added to the germ meal.

After the xanthophyll has been absorbed by the germ meal, the germ meal is then mixed with heavy steep liquor or steep liquor-carbohydrate mixture. Thereafter the product is dried to the proper moisture level. The product may also be pelletized before drying. It appears that the steep liquor alone or in combination with the carbohydrate acts as a protective coating for the germ meal onto which the oil has been absorbed.

If it is desired to use a reducing agent, salts, such as sodium bisulfite or sodium metabisulfite or other salts known to act as mild reducing agents may be used and these may be incorporated at anytime but preferably with the steep liquor or steep liquor mixture since they generally contain sufficient water to dissolve the salt. Reducing agents apparently prevent the product from darkening in color.

The final product may be dried in conventional manner until the moisture content is about 1 to 10 percent. Higher moisture contents result in darkening of the product on storage.

The ratio of germ meal to xanthophyll may vary over a wide range depending upon the potency of xanthophyll desired in the final product. The greatest amount of xanthophyll oil which the spent germ will absorb is about 60 percent. If the potency of the xanthophyll oil is too high for the desired use, it may be diluted with acidulated soap stock or vegetable oil, such as corn oil or grain sorghum oil.

The amount of protective coating, i. e., steep liquor or steep-liquor-carbohydrate mixture may vary widely but should be at least about 35 percent, dry basis, of the entire mixture in order to be effective. From the standpoint of handling the final mixture, it is advisable not to use more than about 60 percent of the protective coating although there is no upper limit as far as preventing oxidative deterioration of the xanthophyll is concerned.

If an antioxidant is used, the amount may vary according to its potency and amount permissible in the final product. When the preferred antioxidant, N, N-diphenyl-paraphenylenediamine (sometimes referred to hereinafter as DPPD), is used concentrations of 0.05 to 0.3 percent of the final product gave satisfactory stability. Inasmuch as DPPD is very slowly soluble even in hot oil, acetone may be used in mixing the DPPD with the xanthophyll oil. Other suitable antioxidants include butylated hydroxyanisole, butylated hydroxytoluene, 6-ethoxy-1, 2 dihydroxy 2,2,4 trimethylquinoline.

If a reducing agent is used, the amount may vary from about 0.05 to about 3.0 percent of the total dried mix.

By means of my invention, it is possible to produce a product having a uniform potency in respect of xanthophyll. This can be accomplished simply by using a uniform amount of a previously standardized xanthophyll solution, such as xanthophyll oil. Further a product which is highly nutritious and of excellent stability in respect of xanthophyll and other carotenoids is produced. A granular product which can be blended with other feeding materials is readily obtained.

The following examples which are typical and illustrative only will further illustrate the invention. In the tables all parts are on dry substance basis.

EXAMPLE I

*Stabilized xanthophyll product on spent corn germ*

Three hundred and sixty grams of spent corn germ flakes was warmed to 120 to 140° F. in a steam jacketed mixing bowl. Xanthophyll oil (extracted from corn gluten) was diluted with acidulated soap stock to give a standardized xanthophyll oil containing 1820 p. p. m. xanthophyll and 706 p. p. m. carotene. An acetone solution containing 1.0 g. DPPD was added to 240 g. of the standardized xanthophyll oil and the whole slowly poured into the spent germ with continuous stirring. Complete absorption of the oil by the germ flakes was obtained in about 3 minutes at 120° F. Three hundred and twenty grams of corn sugar molasses (hydrol) (75% D. S.), 720 g. heavy corn steep liquor (50% D. S.) and 1.0 g. of sodium bisulfite were added successively to the mix with continuous stirring. Stirring was continued until the mix was mealy enough to prevent balling in the drier (about 5 minutes). The product was then dried in a rotary drier until the outlet temperature had reached about 240° F. (Inlet air temperature was maintained at about 350° F.) The resulting product had a moisture content of 3.5 percent. Stability data are given below.

*Stability of xanthophyll at 50° C.*

|  | Percent Remaining | | |
| --- | --- | --- | --- |
|  | 7 days | 14 days | 21 days |
| Initial xanthophyll content, 364 p. p. m. | 99 | 105 | 106 |

EXAMPLE II

*Stabilized xanthophyll product on spent grain sorghum germ*

Sorghum grain germ expeller cake containing about 10 percent of oil was ground to pass through 20 mesh screen. Forty-five grams of this material was mixed with 18 g. of xanthophyll oil which had been standardized to 1820 p. p. m. xanthophyll by dilution with acidulated soap stock. One-tenth gram of DPPD dissolved in acetone was also added to the xanthophyll oil. The oil and germ were mixed for 3 minutes at 120° F. in a mechanical mixer. Then 94 g. of grain sorghum heavy steepwater (42.6%, D. S.) was added followed by 0.1 g. of sodium bisulfite. Mixing was continued for 5 minutes and the product dried as described in Example I. Stability data are given below.

*Stability of xanthophyll at 50° C.*

|  | Percent Remaining | | |
| --- | --- | --- | --- |
|  | 7 days | 14 days | 21 days |
| Initial xanthophyll content, 325 p. p. m. | 88 | 73 | 76 |

EXAMPLE III

The procedure described in Example I was used with the carriers and coating materials listed in Table I except that the procedure used with sorghum grain germ was that described in Example II to show the effect of various coating materials alone and in combination with reducing agents and antioxidants. Thirty parts of carrier, 50 parts coating material and 20 parts of xanthophyll oil were used. The results are shown in Table I.

TABLE I

| Carrier, 30 Parts D. S. | Coating Material, 50 Parts D. S. | Amount Antioxidant or Reducing Agent | No. Runs | Stability, 50° C.—Percent Xanthophyll Remaining, Days | | |
| --- | --- | --- | --- | --- | --- | --- |
|  |  |  |  | 7 | 14 | 21 |
| Corn gluten meal | | | 20 | 70 | 49 | 36 |
| Spent germ | None | None | 2 | 5.5 | ---- | ---- |
| Do | do | 0.3% DPPD | 1 | 2.0 | ---- | ---- |
| Do | do | 0.3% DPPD + 1% NaHSO₃ | 1 | 5.0 | ---- | ---- |
| Do | Hydrol | None | 3 | 25 | 7.0 | ---- |
| Do | Steepwater | do | 4 | 70 | 52 | 47 |
| Do | Steepwater + CSU | do | 3 | 78 | 61 | 54 |
| Do | Steepwater + CSU | 1% NaHSO₃ | 3 | 83 | 72 | 69 |
| Do | Steepwater + hydrol | 1% NaHSO₃ | 3 | 99 | 84 | 61 |
| Do | Steepwater | 0.2% DPPD | 1 | 94 | 91 | 84 |
| Do | Steepwater + hydrol | 0.3% DPPD + 0.3% NaHSO₃ | 3 | 99 | 105 | 106 |

Twenty parts xanthophyll oil used in each case.

The data in Table I show that reducing agents or antioxidants are not effective in stabilizing xanthophyll oil adsorbed on spent corn germ when no exterior coating is applied. The data also show that hydrol alone is ineffective as a protective coating, while steepwater as a coating material produces a product with xanthophyll stability comparable to that of gluten meal. The data also show that a coating composed of steepwater and soluble carbohydrate is superior to steepwater alone. The addition of a small quantity of reducing agent, such as NaHSO₃, results in an increased stabilization of the xanthophyll. The data further show that uncoated germ with adsorbed xanthophyll oil containing 0.3 percent DPPD loses 95 percent of the xanthophyll in 7 days at 50° C. while a similar product coated with steepwater retains 84 percent of its xanthophyll after 21 days at 50° C. When the xanthophyll oil impregnated germ containing DPPD is coated with a mixture of steepwater and hydrol with added NaHSO₃ the xanthophyll retention after 21 days at 50° C. is 106 percent. This figure is within the range of accuracy of present analytical methods and is interpreted to mean complete protection.

Data from Table I are also shown in graph form in Figure I. Identification of curves is as follows:

(1) Xanthophyll oil on spent corn germ meal with antioxidant—no coating.
(2) Xanthophyll oil on spent corn germ meal.
(3) Xanthophyll oil germ meal coated with hydrol.
(4) Xanthophyll oil germ meal coated with steepwater.
(5) Xanthophyll oil germ meal coated with steepwater-hydrol mix plus reducing agent.
(6) Xanthophyll oil germ meal plus DPPD (antioxidant) coated with steepwater.
(7) Xanthophyll oil germ meal plus antioxidant coated with steepwater-hydrol mix and added reducing agent.

EXAMPLE IV

Spent corn germ-xanthophyll oil mixtures were coated with a mixture of steep liquor and each of the following: corn sirup unmixed, dextrose greens and hydrol, in accordance with the method described in Example I. The effect of sodium bisulfite on the mixtures was also investigated. The results are shown in Table II.

EXAMPLE V

This example shows the effect of sodium bisulfite and DPPD on spent corn germ-xanthophyll oil mixture coated with heavy steepwater. The results are shown in Table III.

EXAMPLE VI

This example shows the effect of DPPD on spent corn germ-xanthophyll oil mixtures coated with steepwater. The results are shown in Table IV.

EXAMPLE VII

This example shows the effect of antioxidants and reducing agents on spent corn germ-xanthophyll oil mixtures with and without a protective coating. The results are shown in Table V.

TABLE II

| Type of Carbohydrate a | Percentage Xanthophyll Remaining—Days | | | | | | | | |
|---|---|---|---|---|---|---|---|---|---|
| | No NaHSO₃ | | | 1% NaHSO₃ when mixed | | | 1% NaHSO₃ before mxing b | | |
| | 7 c | 14 | 21 | 7 | 14 | 21 | 7 | 14 | 21 |
| CSU (D. S., 82%) | 86 | 68 | 45 | 99 | 75 | 47 | 91 | 72 | 52 |
| Second greens (D. S., 67%) | 85 | 79 | 56 | 97 | 88 | 70 | 98 | 88 | 69 |
| Hydrol (D. S., 75%) | 95 | 68 | 54 | 100 | 89 | 66 | 97 | 82 | 66 |
| Avg | 89 | 72 | 52 | 99 | 84 | 61 | 95 | 81 | 62 | a 40 parts carbohydrate (D. B.) mixed with 60 parts steepwater D. S., 50%; then 45 part used to coat 55 parts of X-oil-germ meal mixture (40 X-oil, 60 germ). Product pelleted.
b The bisulfite was mixed with the carbohydrate 18 hrs. before mxing with the steepwater.
c Days storage at 50° C. in open petri dish.

TABLE III

| Initial Xanthophyll Conc.a | Percentage Xanthophyll Remaining—Days | | | | | | | | | | | |
|---|---|---|---|---|---|---|---|---|---|---|---|---|
| | No Additives | | | 1% NaHSO₃ | | | 0.0125% DPPD | | | 1% NaHSO₃, 0.0125% DPPD | | |
| | 7 b | 14 | 21 | 7 | 14 | 21 | 7 | 14 | 21 | 7 | 14 | 21 |
| 580 | 71 | 54 | 48 | 76 | 64 | 56 | 86 | 70 | 70 | 86 | 80 | 76 |
| 515 | 71 | 52 | 44 | 71 | 52 | 50 | 63 | 59 | 54 | 80 | 70 | 62 |
| 280 | 74 | 50 | 48 | 65 | | | 75 | 71 | 69 | 81 | 70 | 72 |
| 190 | 64 | 53 | 49 | 74 | 63 | 58 | 68 | 71 | 57 | 88 | 72 | 63 |
| Avg | 70 | 52 | 46 | 72 | 60 | 55 | 73 | 68 | 63 | 84 | 73 | 68 | a X-oil diluted with acidulated soapstock to desired xanthophyll levels, 20 parts; spent germ meal, 30 parts; steepwater 50% D. S., 50 parts. Pelleted.
b Days at 50° C. in open petri dish.

TABLE IV

| Base Mix Ratio, X-oil:germ | Steepwater, Percent of Product, D. B. | DPPD | | Xanth. Initial, p. p. m. | Percentage Xanthophyll Remaining—Days | | |
|---|---|---|---|---|---|---|---|
| | | Percent on X-oil | Percent on Product | | 7 a | 14 | 21 |
| 40:60 | 50 | 0.75 | 0.15 | 430 | 98 | 98 | 91 |
| | 35 | | 0.196 | 535 | 99 | 94 | 89 |
| | 20 | | 0.24 | 620 | 88 | 90 | 69 |
| 40:60 | 50 | 1.0 | 0.2 | 486 | 94 | 91 | 84 |
| | 35 | | 0.26 | 565 | 84 | 81 | 80 |
| | 20 | | 0.32 | 680 | 89 | 72 | 66 |
| 30:70 | 50 | 1.0 | 0.15 | 367 | 89 | 88 | 84 |
| | 35 | | 0.195 | 470 | 88 | 76 | |
| | 20 | | 0.24 | 548 | 80 | 70 | 72 | a Days at 50° C. in petri dish.

TABLE V

| Xantho-phyll, Percent D. B. Calc. | Ratio, X-oil: germ | DPPD, Percent of Oil | NaHSO₃, Percent of Product | Coating Material | Percentage Xanthophyll Remaining [b]—Days at 50° C. | | |
|---|---|---|---|---|---|---|---|
| | | | | | 7 | 14 | 21 |
| 790 | 40:60 | 0.625 | 0.0 | None | 2.3 | | |
| 790 | 40:60 | 0.0 | 0.25 | do | 0.4 | | |
| 790 | 40:60 | 0.625 | 0.25 | do | 4.9 | | |
| 395 | 40:60 | 0.625 | 0.125 | Steepwater,[a] 50% D. S. | 102 | 93 | |

[a] 50% of product, D. B.
[b] Based on calculated xanthophyll content.

I claim:

1. A dry feed composition containing carotenoid pigments which is stable against oxidative deterioration comprising a deoiled vegetable oil bearing material having absorbed thereon carotenoid pigments and coated with a coating material from the group consisting of steep liquor and steep liquor in combination with any of the following: corn sirup, dextrose greens, molasses, and mixtures thereof, the amount of steep liquor in said combination being at least about 50 percent, dry basis; the amount of coating material being at least 35 percent, dry basis, of the entire mixture.

2. A composition according to claim 1 having incorporated therein an antioxidant.

3. A composition according to claim 1 having incorporated therein a reducing agent.

4. A composition according to claim 1 having incorporated therein an antioxidant and a reducing agent.

5. A composition according to claim 1 wherein the carotenoid pigments are supplied by xanthophyll oil, in amount not exceeding 60 percent of said carrier.

6. A process for producing a dry feed composition containing carotenoid pigments which comprises mixing a solution of carotenoid pigments and a deoiled vegetable oil bearing material and coating this mixture with a coating material from the group consisting of steep liquor and steep liquor in combination with any of the following: corn sirup, dextrose greens, molasses, and mixtures thereof, the amount of steep liquor in said combination being at least about 50 percent, dry basis; and drying the resultant mixture; the amount of coating material being at least 35 percent, dry basis, of the entire mixture.

7. Process according to claim 6 wherein an antioxidant is incorporated in the mixture sometime prior to drying.

8. Process according to claim 6 wherein a reducing agent is incorporated in the mixture sometime prior to drying.

9. Process according to claim 6 wherein a reducing agent and an antioxidant are incorporated in the mixture sometime prior to drying.

10. Process according to claim 6 wherein the solution of carotenoid pigments is xanthophyll oil, the amount not exceeding about 60 percent of said carrier.

References Cited in the file of this patent

UNITED STATES PATENTS

| 491,234 | Behr | Feb. 7, 1893 |
| 2,303,466 | Hunter | Dec. 1, 1942 |
| 2,375,278 | Buxton | May 8, 1945 |